July 4, 1939.  A. L. PARKER  2,164,471
FLEXIBLE COUPLING FOR TUBES
Filed Sept. 14, 1936   2 Sheets-Sheet 2
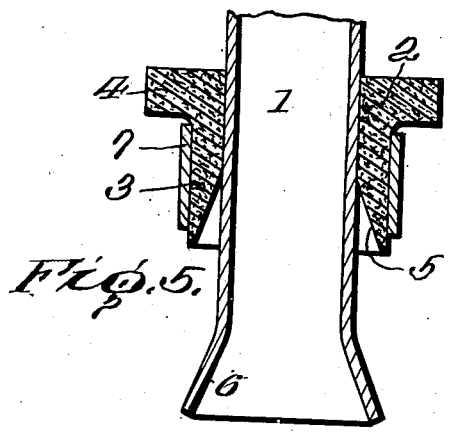
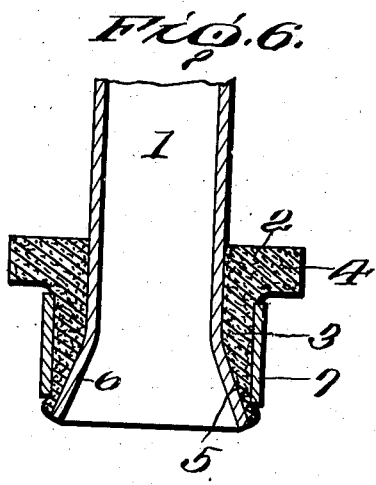
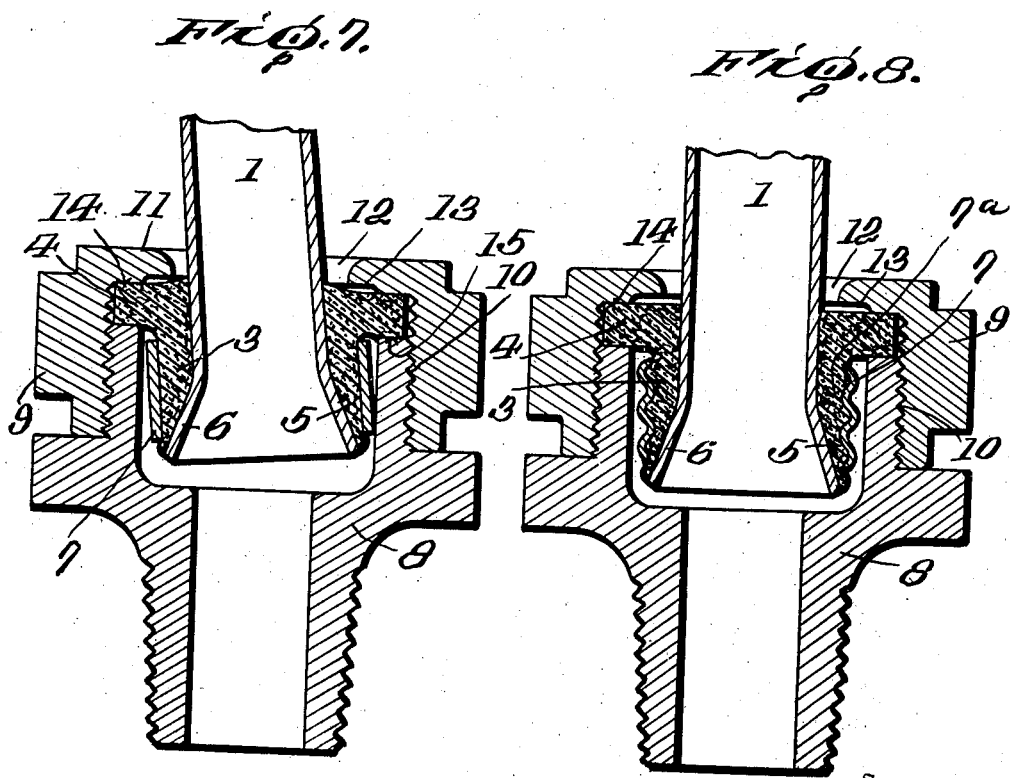
Inventor
Arthur L. Parker
By Mason & Porter
Attorneys Patented July 4, 1939

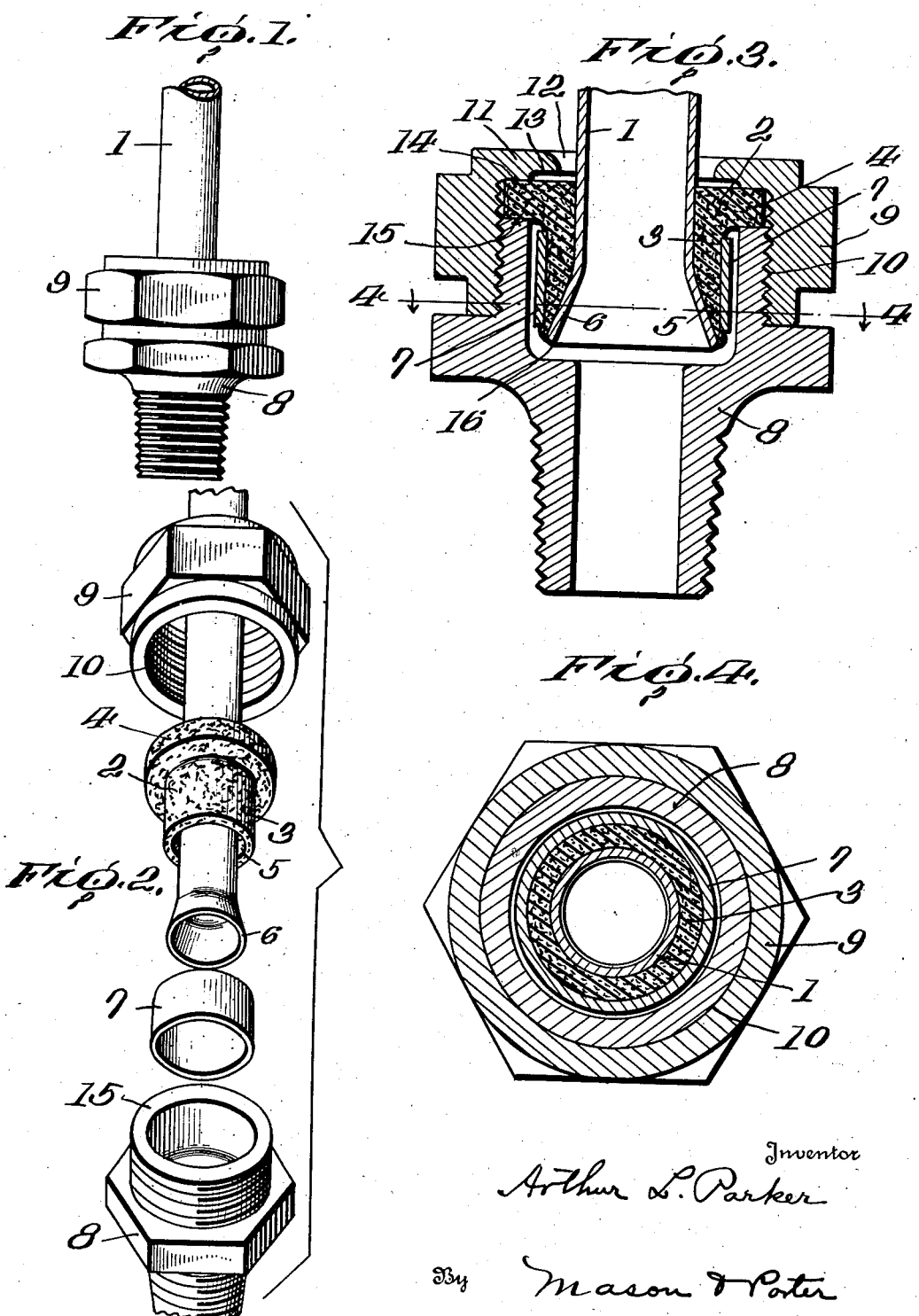

2,164,471

UNITED STATES PATENT OFFICE 2,164,471

FLEXIBLE COUPLING FOR TUBES

Arthur L. Parker, Cleveland, Ohio

Application September 14, 1936, Serial No. 100,755

1 Claim. (Cl. 285—90)

The invention relates to new and useful improvements in a flexible coupling which may be used for joining a tube to another part or for joining two tubes in a line.

An object of the invention is to provide a flexible tube coupling wherein a tube having a tapered end is secured to the coupling members by a resilient supporting sleeve which is caused to firmly grip the tube end and which in turn is firmly clamped to the coupling members in a restricted region which permits the sleeve and tube to shift to different angular positions in the coupling members.

In the drawings—

Figure 1 is a side view of a coupling with a tube joined thereto;

Fig. 2 is a view showing the parts of the coupling separated and in perspective;

Fig. 3 is a sectional view on an enlarged scale through the coupling;

Fig. 4 is a sectional view on the line 4—4 of Fig. 3;

Fig. 5 is a sectional view showing the tube with the end flared and with the clamping sleeve placed thereon;

Fig. 6 is a view showing the clamping sleeve moved into gripping engagement with the flared or tapered end of the tube;

Fig. 7 is a view similar to Fig. 3, but showing the tube as flexed or shifted to a position at an angle to the longitudinal axial line of the coupling, and Fig. 8 is a view similar to Fig. 3, but showing a modified form of construction.

In carrying out the invention, a resilient sleeve is formed which is adapted to hug fairly tightly the tube which is to be clamped in the coupling members when said sleeve is slipped over the same. This sleeve has one end thereof formed so as to provide a tapered recess. The end of the tube either before or after the coupling is placed thereon is tapered or flared in the usual manner. The resilient sleeve has a projecting flange at the opposite end from the tapered recess. A metal sleeve is slipped over the resilient sleeve so as to contact therewith in a region between the flange and the end having the tapered recess. After these parts have been thus assembled on the tube, then the sleeve is slipped along the tube until it contacts with the tapered end of the tube. As the tapered end of the sleeve contacts with the tapered end of the tube, it is expanded, and this expansion is resisted by a metal collar surrounding the resilient sleeve, and thus a very firm grip between the resilient sleeve and the tube can be made. The coupling may be of any desired construction, but preferably includes two members having threaded engagement with each other. One of these members has a recess which is slightly larger in diameter than the metal collar and the tube end with the sleeve assembled thereon is inserted in this recess. The flange of the sleeve overlies the end of the coupling member, and when the coupling members are threaded together, this flange of the resilient sleeve is firmly gripped and serves as the sole means for connecting the tube to the coupling member.

Referring more in detail to the drawings, the tube which is to be clamped is indicated at 1. Slipped on to this tube is a resilient sleeve 2 preferably of rubber, although it may be made of any other material which is non-compressible and elastic. The sleeve is provided with a cylindrical body portion 3 from which projects a flange 4. The sleeve is shaped so as to provide a tapered recess 5. After the sleeve has been placed on the tube, the end of the tube 1 is subjected to a flaring tool, and the end is flared or tapered as indicated at 6. This tapered end of the tube conforms in a general way to the tapered recess 5 in the resilient sleeve. It is possible to slip the resilient sleeve on to the tube after the end is flared, if desired, and this would be the procedure in case the sleeve becomes worn and it is desired to replace the same in a coupling which has been installed for use.

After the resilient sleeve is placed on the tube, then the metal collar 7 is slipped over the same. This metal collar is slightly larger in diameter than the extreme diameter of the tapered end of the tube. It fits the sleeve snugly, but with sufficient looseness so that it may be slipped on to the sleeve by hand, if desired. This metal collar extends from a point near the flange 4 to a point preferably a short distance from the end of the sleeve.

After the parts have been assembled as shown in Fig. 5, then the sleeve is moved along the tube until it contacts with the tapered end thereof, as shown in Fig. 6. This may be done by hand, and the sleeve pressed tightly against the tapered end. As the resilient sleeve slides on to the tapered end, it tends to expand. The metal collar 7, however, restrains it from expanding and the result is a very firm grip of the resilient sleeve against the end of the tube, and particularly the flared or tapered end thereof.

The illustrated coupling to which the tube is to be joined consists of a male member 8 and a female member 9 having a threaded connection indicated at 10. The female member 9 is provided with an inwardly projecting flange 11 having an opening 12 therethrough which is of larger diameter than the diameter of the tube to be clamped in the coupling so as to permit lateral movement of the tube in the coupling. The under face of the flange 11 is cut away at 13 so as to provide a clamping shoulder 14 which contacts with the flange of the resilient sleeve in the region directly opposite the end 15 of the male coupling member. The male coupling member is provided with a recess or chamber 16 which receives the tube end assembly with the flange 4 contacting with the end of the coupling member. When this female member is threaded on to the male member, the clamping shoulder 14 will firmly clamp the flange against the end 15 of the male coupling member, and thus it is that the resilient sleeve is attached to the coupling members. This serves as the sole means for connecting the resilient sleeve to the coupling member. The recess or chamber 16 is so dimensioned that there is a space between the metal collar 7 and the wall 17 of said recess. The end of the tube is also spaced away from the coupling so that all of the parts of the resilient sleeve beneath the flange and the metal collar 7 have a limited lateral movement in said chamber. The tube is not clamped against the coupling members, but is held solely through the clamping action of the metal collar co-acting on the resilient sleeve and the engagement of the resilient sleeve with the tube. This permits the tube to flex as shown in Fig. 7. When the tube shifts to a different angular position, the flange of the resilient sleeve will yield and permit this shifting of the tube. The yielding portion of the sleeve is entirely in the flange and the resilient sleeve is not in any way released from its firm gripping engagement with the tapered end of the tube.

In Fig. 8 of the drawings, there is shown a slightly modified form of construction of metal collar. It is quite essential that this metal collar shall firmly contact with the resilient sleeve and in order to facilitate the connecting of the metal collar to the resilient sleeve, the metal collar is provided with threads as indicated at 7a. These threads are of the ordinary construction and enable the metal collar by the turning thereof to be readily forced on to the resilient sleeve. If desired, the resilient sleeve may be threaded, or it may yield to accommodate the threads formed in the metal collar.

It will be noted that the metal collar is of uniform diameter throughout and can be slipped over the tapered end of the tube. This enables the resilient sleeve and the metal collar to be assembled as shown in Fig. 5, and then the assembled parts forced on to the flared end of the tube to obtain a firm gripping contact therewith. It will also be noted that the coupling member 9 is cut away at 13 so that the flange of the resilient sleeve is clamped in a region spaced away from the body portion of the sleeve. This, together with the cut-away portion mentioned, permits the deforming of the flange and the sleeve in the region thereof.

When it is desired to disassemble the coupling for repair purposes, the resilient sleeve may be readily moved back away from the flared end of the tube, thus releasing the pressure against the metal collar surrounding the same, and then the metal collar removed. This enables the resilient sleeve to be taken from the tube and a new resilient sleeve substituted therefor.

Having thus described the invention, what I claim as new and desire to secure by Letters Patent, is—

A flexible coupling for tubes including metal coupling member having a recess therebetween adapted to receive the tapered end of a tube, a resilient sleeve surrounding the tube, said sleeve having a laterally projecting flange at the inner end thereof, a metal collar of substantially uniform diameter adapted to slip over the resilient sleeve, said metal collar extending from a point adjacent the projecting portion of the resilient sleeve to a point adjacent the inner end thereof and dimensioned so as to cause said resilient sleeve to firmly grip the tube end and provide a fluid-tight supporting engagement therewith when moved into engagement with the tapered end of the tube, said coupling members having means for contacting with and gripping said projecting flange of the resilient sleeve in a region spaced away from the body portion thereof, all of said parts being dimensioned so as to permit the projecting flange of the resilient sleeve to flex and the tube to shift to different angular positions in said coupling.

ARTHUR L. PARKER.